UNITED STATES PATENT OFFICE.

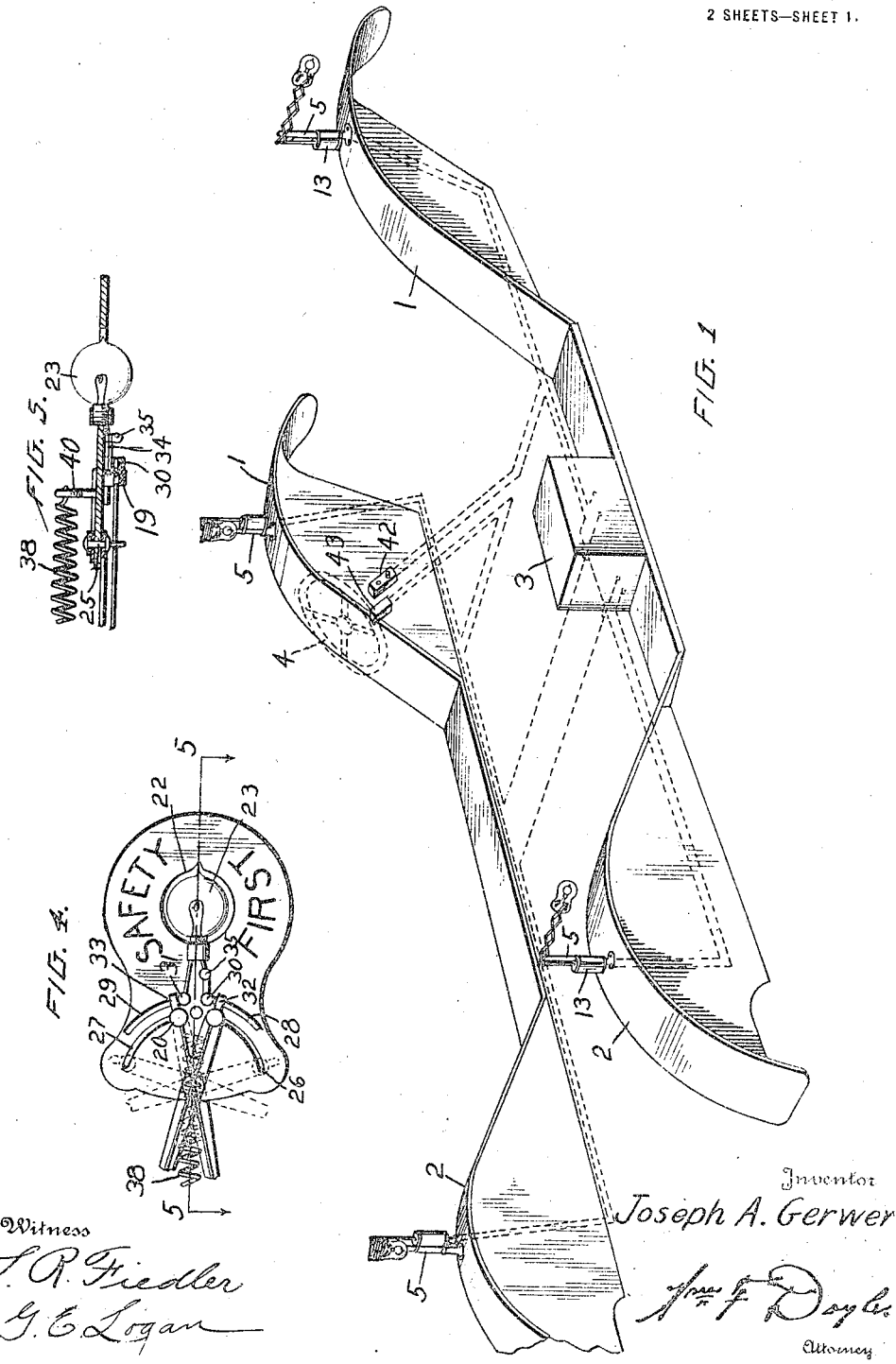

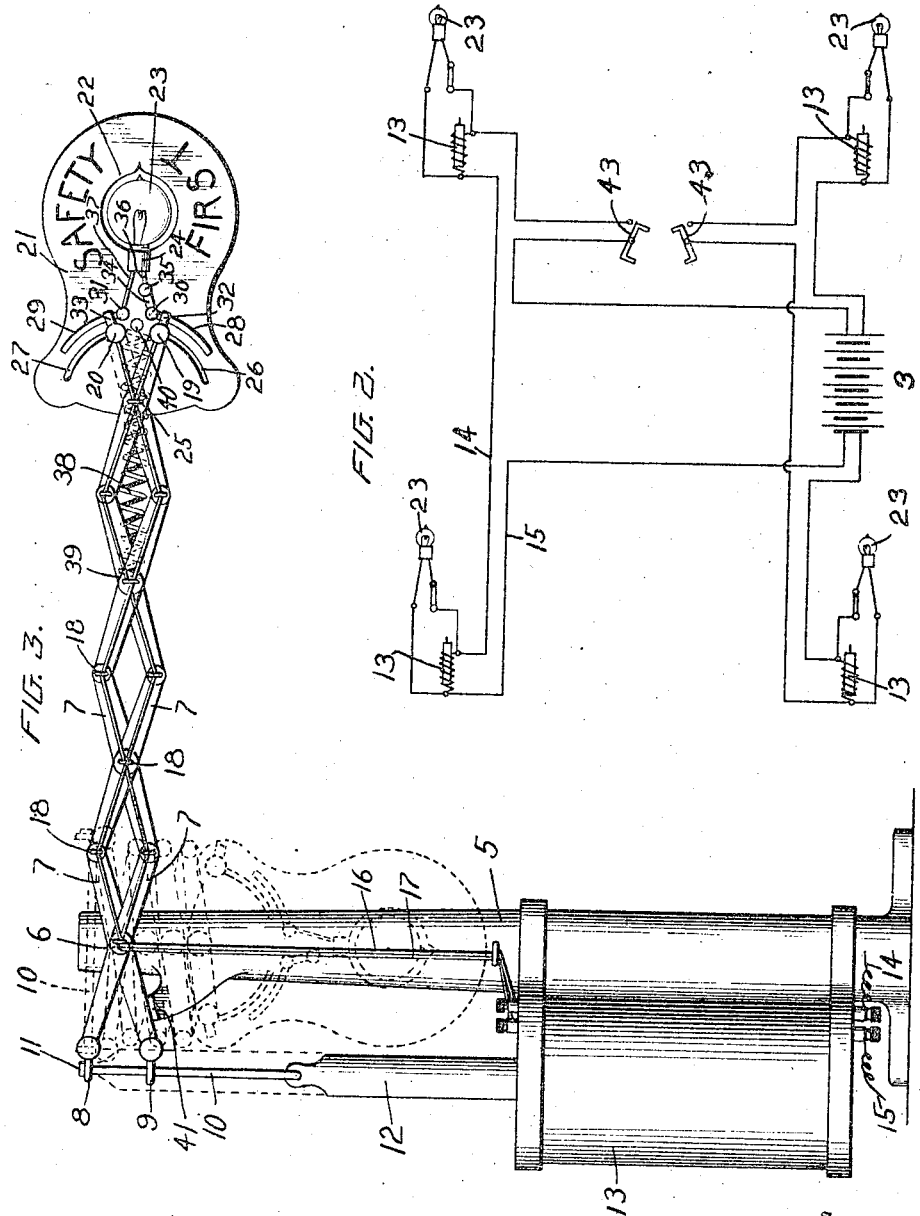

JOSEPH A. GERWER, OF STAPLETON, NEW YORK.

SIGNAL FOR VEHICLES.

1,297,829.

Specification of Letters Patent. Patented Mar. 18, 1919.

Application filed May 20, 1916. Serial No. 98,823.

*To all whom it may concern:*

Be it known that I, JOSEPH A. GERWER, a citizen of the United States, residing at Stapleton, in the county of Richmond, State of New York, have invented certain new and useful Improvements in Signals for Vehicles, of which the following is a description, reference being had to the accompanying drawings, forming a part hereof.

My invention relates to signals for vehicles, especially adapted for use on automobiles or other vehicles usually driven at high speed and one on which the operator wishes at times to indicate to drivers of other vehicles as well as to pedestrians the direction he intends to take or that he intends to stop or slacken his speed.

The object of the invention is to provide a simple, durable and inexpensive mechanism that may be applied to an automobile in various positions, as for instance on the mud guard over the front or rear wheels or in both positions so that the signal may be clearly seen by the operators of other vehicles so that those ahead as well as in rear of the signaling machines may clearly discern the intentions of the operator of said machine. The apparatus has special utility in cities or towns wherever traffic is congested.

In carrying out the invention, indicator members of any preferred form are provided with means for projecting said indicators out beyond the side of the car into such a position as to be readily seen from both front and back. The projecting means may be attached to the dash, mud guard or side of the car, either forward or at the rear or in both positions, the location being controlled by the type of vehicle to which the device is to be applied. To be clearly visible at night, the indicator head is provided with an electric light so positioned as to cast its light on both sides of the indicator to make it plainly observable from either direction.

An object in view is to provide a signal on either side of a car which indicates to the operator or to a following car that it is unsafe to attempt to pass the forward car on either one side or the other as the signal may be displayed, and further if both signals are set, it will be a signal to the following car that the forward car has right-of-way in both directions and will therefore amount to a stop signal. Therefore it will be seen that not only a direction signal is provided, but in addition thereto a stop signal, since by the simultaneous operation of the signals on both sides of the machine blocks passage on both sides and thereby provides a stop signal.

While slight modifications may be resorted to as to the minor details of construction without departing from the spirit of the invention, a preferred form may be seen in the drawings, in which—

Figure 1 is a perspective view of the mud guard of an automobile with no other parts shown indicating the position of the signals as mounted thereon and showing in dotted lines the course of the wiring from said signals through the storage battery and to the control buttons on the steering post.

Fig. 2 is a diagrammatic view of the wiring.

Fig. 3 is an enlarged detail of the signal showing same in its extended position in full lines and in its retracted position in dotted lines.

Fig. 4 is a detail view of the signal plate or head showing the contact and brush for making and breaking the circuit to light bulb carried on the signal head.

Fig. 5 is a detail section on line 5—5, of Fig. 4.

Reference now being had to the drawings by numerals in which similar numerals indicate corresponding parts in all the figures of the drawings, 1—1 are the forward mud guards and 2—2 the rear mud guards, 3 the storage battery and 4 the steering wheel of any preferred form of automobile.

Mounted conspicuously on said mud guards at points usually directly over the center of the wheel or at their highest points are posts 5, said posts being all of a similar construction with their mounted parts thereon, it will be necessary only to describe in detail one of said members.

Pivotally mounted at 6 on post 5 are the inner members of a series of lazy-tongs 7, said lazy-tong members being provided at their inner ends with loops or bearing members 8 and 9. Passing through loops 8 and 9 is a rod 10, said rod being provided at its upper end with a nut or other similar form of enlargement to prevent its passage through loop 8. Said rod 10 is adapted to slide freely through loop 9 and be secured at its lower end to the core 12 of a solenoid 13 mounted rigidly to post 5.

Conductor wires 14 and 15 supply current from the storage battery, as indicated at 3, and conductor wires 16 and 17 extending from the solenoid to the pivot point of the lazy-tongs at 6 and from thence through eyelets 18 mounted at the pivotal points of said lazy-tongs out to binding posts 19 and 20 at the outer ends of the outer lazy-tong members. Said conductor wires 16 and 17 are adapted to be in circuit with the current supplied by wires 14 and 15 to the solenoid in such a manner that when the solenoid is energized to project the signal, the current will extend into wires 16 and 17 out to posts 19 and 20.

The signal head or indicator 21 is preferably constructed of sheet metal and is provided with appropriate lettering, as indicated, and a centrally located opening 22 in which is mounted an electric bulb 23 mounted in the socket 24 rigidly mounted to the plate. The outer pair of lazy-tongs is pivotally mounted at 25 in the inner portion of the signal head, one on either side thereof and are provided with posts 19 and 20 having projections which enter slots 26 and 27 in the head, said slots being struck on an arc with pivot point 25 as a center. In this manner, head 21 is mounted at the outer ends of the lazy-tongs and, as shown in the drawings, assumes a horizontal position when projected by said lazy-tongs.

Contacts 28 and 29 are mounted on the face of the indicator and are insulated therefrom and are provided at their inner ends with posts 30 and 31. Said contacts 28 and 29 are arranged on an arc with pivot point 25 as its center, and brush members 32 and 33 extending from posts 19 and 20 are adapted when the lazy-tong members are operated to come in contact with said contacts 28 and 29 to complete the circuit up to posts 30 and 31.

Mounted in a preferred manner on post 30 is a switch member 34. Said switch member 34 may be brought into contact with a post 35 mounted on the signal head or swung into contact with post 31. Conductor wires 36 and 37 connect post 35 with socket 24 and post 31 with said socket 24. The purpose of switch 34 is when that device is in use during the day, the illumination of the bulb 23 is not necessary, therefore during day, switch 34 is brought to a position in which the current crosses from post 30 to 31 and back through the return wire to its source of supply, thus completing the circuit for the operation of the solenoid, yet shunting the lighting bulb.

To return the parts to their folded or retracted position, a spring 38 is mounted at one end to the lazy-tongs at one of their crossing points, as indicated at 39, and at their outer end at 40 to the indicator, said spring when signal is projected being placed under tension and being so mounted that when the current is cut off, said spring will collapse the lazy-tong members to the position shown in dotted lines in Fig. 3.

It will be noted by reference to Fig. 3 that post 5 is provided with a stop member 41 in such a position that when one of the members of the inner pair of toggle levers is swung to the position shown, said stop will form an abutment against which said lever will rest and establish the necessary position of the parts when signal is projected. It will be noted that when the solenoid is deënergized and the core 12 is allowed to rise, the tension of the spring 38 will bring the lazy-tongs into a collapsed or folded position and at the same time parts will swing on pivot 6 down to the position shown in dotted lines. When the parts are folded, it will be noted that bar 10 assumes a horizontal position, said horizontal position being permitted by the members 8 and 9 swinging into the proper position to permit said movement of bar 10.

By reference to Figs. 1 and 2, it will be noted that make and break contacts, as shown at 42 and 43, are provided on opposite sides of the steering post in circuit with signals on corresponding sides of the automobile and the required wiring to energize the signaling mechanisms on one side of the car or the other may be controlled either separately or simultaneously if desired.

The operation of the device is as follows:

If it is the intention of the operator of a machine on which the improved signal is applied to round a corner to the right, the signals, as shown in Fig. 1, are set by pressure on the switch 42 which completes the circuit through the solenoids 13 mounted on the right-hand side of the machine, the first movement of the parts being to draw the core 12 down, said movement swinging the inner toggle levers into a position in which one of said members comes in contact with stop 41. In this position, said member is arrested in its movement and the further movement of the core draws rod 10 down through loop 9 mounted on said toggle member and the further movement of core 12 brings the other member of the first pair of lazy-tong members into the position, as shown in full lines in Fig. 3, to project the signal.

When the signal is projected, it will be perfectly clear that the contacts on the signal head will be established and the circuits completed either out through the lamp or across from post 30 to 31 and back through post 20 according to the position switch 34 is in, thereby establishing the necessary completed circuit for operating the solenoid. When the current is cut off, spring 38 will collapse the parts and they will assume the position shown in dotted lines.

Having fully described my invention, what I claim is:—

A signaling apparatus for vehicles, comprising a plurality of independently operable elements, consisting of sets of lazy-tongs mounted at the sides of the car, indicators mounted on the lazy-tongs, electric lamps centrally located on the indicators, contact members mounted on the indicators, conductor wires connecting the contacts and the lamps, conductor wires carried on the lazy-tongs in communication with the source of electrical energy, brush contact members at the ends of the conductor wires for frictional engagement with the contacts on the indicators when said indicators are projected, said indicators designed when projected to separately indicate the intention of the driver to change direction or simultaneously to indicate intention to stop, and means for operating the indicators, the same embodying independently operable members.

This specification signed and witnessed this fourth day of May A. D. 1916.

JOSEPH A. GERWER.

In the presence of—
C. W. SCHUTZENDORF,
JOHN B. CUNNELL.